(12) United States Patent
Scheiman

(10) Patent No.: US 10,989,898 B2
(45) Date of Patent: Apr. 27, 2021

(54) QUAD-AXIS ROTATABLE COUDÉ PATH

(71) Applicant: Government of the United States, as represented by the Secretary of the Air Force, Wright-Patterson, OH (US)

(72) Inventor: Kevin S. Scheiman, Huber Heights, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/885,462

(22) Filed: May 28, 2020

(65) Prior Publication Data

US 2020/0292783 A1   Sep. 17, 2020

Related U.S. Application Data

(62) Division of application No. 15/494,576, filed on Apr. 24, 2017, now Pat. No. 10,712,532.

(51) Int. Cl.
G02B 7/182 (2021.01)
G02B 23/16 (2006.01)
B64G 3/00 (2006.01)

(52) U.S. Cl.
CPC ............. G02B 7/1821 (2013.01); B64G 3/00 (2013.01); G02B 23/16 (2013.01)

(58) Field of Classification Search
CPC .................. G02B 7/1821; G02B 23/16; G02B 23/00–26; G02B 1/11–118; G02B 5/0816–0875; G02B 5/0284; G02B 5/0294; G02B 26/06; G02B 23/02; G02B 26/0816; G02B 23/06; G02B 26/105; G02B 7/1827; G02B 26/101; G02B 7/183; G02B 17/0884; G02B 7/00; G02B 7/003; G02B 7/182–183; G02B 17/0663; G02B 27/644; G02B 17/0642; B64G 3/00; B60R 1/083–089; F41G 3/22; F41G 3/145; F41G 3/326; F41G 3/32; G03B 15/006; G03B 5/00
(Continued)

(56) References Cited

U.S. PATENT DOCUMENTS 3,464,116 A  9/1969 Kissell
4,395,095 A  7/1983 Horton
(Continued)

OTHER PUBLICATIONS

Avila et al. VLT Optics Design of Coude Optics, Oct. 1990, European Southern Observatory, pp. 3-16 (Year: 1990).*
(Continued)

*Primary Examiner* — Marin Pichler
*Assistant Examiner* — Alberto J Betancourt
(74) *Attorney, Agent, or Firm* — AFMCLO/JAZ; Timothy Barlow

(57) ABSTRACT

An optics system, a telescope system, and an optics system for a telescope are provided. The optics system may include a plurality of mirrors arranged around and centered about four orthogonal, rotational axes in a quad-axis Coudé optical path. The rotational axes are consecutively dependent on one another, and the plurality of mirrors direct light to a predetermined region irrespective of an orientation of an incident beam directed to the plurality of mirrors.

7 Claims, 8 Drawing Sheets

(58) Field of Classification Search
USPC .............. 359/399–431, 580–588, 602–608; 244/3.1, 3.15, 3.16, 3.23, 3.24, 3.28, 3.29, 244/3.3
See application file for complete search history.

(56) References Cited

U.S. PATENT DOCUMENTS

| | | |
|---|---|---|
| 5,115,355 A | 5/1992 | Dunn |
| 5,204,785 A | 4/1993 | Tang |
| 5,477,395 A * | 12/1995 | Cook ................. G02B 17/0657 359/365 |
| 5,631,770 A * | 5/1997 | Jarmuz ............. G02B 17/0808 359/351 |
| 7,894,144 B2 | 2/2011 | Wein |
| 8,801,202 B2 | 8/2014 | Cook |
| 8,982,458 B2 | 3/2015 | Blackburn |
| 2006/0098276 A1 * | 5/2006 | Kim ....................... G02B 7/003 359/399 |
| 2007/0229994 A1 | 10/2007 | Cook |
| 2010/0128244 A1 | 5/2010 | Koehler |
| 2012/0292482 A1 | 11/2012 | Cook |
| 2013/0070238 A1 | 3/2013 | Fasse |

OTHER PUBLICATIONS

Harrington et al.—(Polarization modeling and predictions for Daniel K. Inouye Solar Telescope part 1: telescope and example instrument configurations; Journal of Astronomical Telescopes, Instruments, and Systems, Feb. 2017) (Year: 2017).

Two-axis gimbal for air-to-air and air-to-ground laser communications; Talmor et al.; Facebook Inc., Mar. 15, 2016 (Year 2016).

\* cited by examiner

QUAD-AXIS ROTATABLE COUDÉ PATH

GOVERNMENT INTEREST

The invention described herein may be manufactured, used, and licensed by or for the U.S. Government.

FIELD OF THE INVENTION

The embodiments herein generally relate to an optics system for a quad axis telescope mount, and more particularly to an optics system configured to direct a beam incident on a telescope in the quad axis mount to a focal plane at a predetermined region in space regardless of the orientation of the telescope collecting the incident beam, and a telescope system incorporating the optics system and a quad axis mounted telescope.

BACKGROUND OF THE INVENTION

A quad axis mounted telescope can be used to approximately track the apparent path of an orbiting satellite such as disclosed in U.S. Pat. No. 3,464,116, issued Sep. 2, 1969, the entire contents of which is hereby incorporated by reference as though fully set forth herein. The quad axis mount can facilitate continuous and accurate aiming of narrow-field cameras, light detectors or transmitters, and the like at an orbiting satellite. A detector, camera, recording instrument, transmitting instrument, and the like may be mounted to the bottom of the telescope in the quad axis mount. Generally, the use of the light beam from the quad axis mounted telescope may be limited to the instrument mounted to the bottom of the telescope. Further, the instrument may be limited by any of size and weight that may be supported by the bottom of the telescope in the quad axis mount.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides an optics system having a plurality of mirrors arranged around and centered about four orthogonal, rotational axes in a quad-axis Coudé optical path. In the optics system provided by the examples herein, the rotational axes are consecutively dependent on one another. In the optics system of the examples herein, the plurality of mirrors direct light to a predetermined region irrespective of an orientation of an incident beam directed to the plurality of mirrors.

In some embodiments of the optics system, the four orthogonal, rotational axes may include a first axis, a second axis, a third axis, and a fourth axis, and the second, third, and fourth axes are selectively movable with respect to the first axis. The second axis may move the third axis and fourth axis with respect to the second axis. The third axis may move the fourth axis with respect to the third axis.

In some embodiments of the optics system, the first axis may be positioned orthogonal to the horizon. The second axis may be parallel to the horizon and orthogonal to the first axis. The third axis may be orthogonal to each of the second axis and the fourth axis. The optics system of the embodiment may further include a rotational mechanism that rotates the plurality of mirrors. The plurality of mirrors may include any of flat mirrors and curved mirrors. The plurality of mirrors may include ten mirrors. The plurality of mirrors may include at least seven mirrors.

Another embodiment provides a telescope system including a telescope having an optical axis, and an optical path. The optical path includes a first portion, a second portion, a third portion, and a fourth portion, each portion defined between two mirrors. The first portion has a mirror disposed on a first rotational axis, and the first portion is configured to receive an incident beam along the optical axis of the telescope and to reflect the incident beam as a beam along the first rotational axis. The second portion is disposed rotatable to the first portion along the first rotational axis and disposed on a second rotational axis, and the second portion is configured to reflect the beam from the first rotational axis to along the second rotational axis. The third portion is disposed rotatable to the second portion along the second rotational axis and disposed on a third rotational axis, the third portion is configured to reflect the beam from the second rotational axis to along the third rotational axis. The fourth portion is disposed rotatable to the third portion along the third rotational axis and disposed on a fourth rotational axis, the fourth portion is configured to reflect the beam from the third rotational axis to along the fourth rotational axis to a predetermined region. In the telescope system, the optical axis of the telescope is selectively articulable about the first, second, third, and fourth rotational axes. The optical path of the telescope system is configured to reflect the incident beam to the predetermined region irrespective of any rotation of the first, second, third, and fourth rotational axes.

In some embodiments of the telescope system, the first rotational axis may be orthogonal to the optical axis of the telescope, the second rotational axis may be orthogonal to the first rotational axis and the third rotational axis, and the third rotational axis may be orthogonal to the fourth rotational axis.

Another embodiment herein provides an optics system for a telescope. The optics system includes an optical path. The optical path includes a first mirror, a second mirror, a third mirror, a fourth mirror, a fifth mirror, a sixth mirror, and a seventh mirror. The first mirror is disposed on a first portion of a first rotational axis, and is configured to reflect an incident beam from along an optical axis of the telescope to along the first rotational axis as a first reflected beam. The second mirror is spaced apart from the first mirror and disposed on a second portion of the first rotational axis. The second mirror is configured to reflect the first reflected beam from the first rotational axis as a second reflected beam. The second portion of the first rotational axis is rotatable relative to the first portion of the first rotational axis. The third mirror is disposed on a first portion of a second rotational axis, and is configured to reflect the second reflected beam as a third reflected beam along the second rotational axis. The fourth mirror is disposed on a second portion of the second rotational axis. The fourth mirror is configured to reflect the third reflected beam from the second rotational axis as a fourth reflected beam. The second portion of the second rotational axis is rotatable relative to the first portion of the second rotational axis. The fifth mirror is disposed on a first portion of a third rotational axis, and is configured to reflect the fourth reflected beam as a fifth reflected beam along the third rotational axis. The sixth mirror is disposed on a second portion of the third rotational axis, and is configured to reflect the fifth reflected beam from the third rotational axis as a sixth reflected beam. The second portion of the third rotational axis is rotatable relative to the first portion of the third rotational axis. The seventh mirror is disposed on a first portion of a fourth rotational axis, and is configured to reflect the sixth reflected beam as a seventh reflected beam along the fourth rotational axis to a predetermined region disposed on a second portion of the fourth rotational axis. The second portion of the fourth rotational axis is rotatable relative to the first portion of the fourth rotational axis. In the optics system, the optical path is configured to reflect the incident beam to the predetermined region as the seventh reflected beam irrespective of any rotation of the first, second, third, and fourth rotational axes.

In some embodiments of the optics system, the second and third mirrors may be disposed on a first yoke rotatable relative to the first mirror about the first rotational axis, the fourth and fifth mirrors may be disposed on a second yoke rotatable relative to the first yoke about the second rotational axis, and the sixth and seventh mirrors may be disposed on a third yoke rotatable relative to the second yoke about the third rotational axis and rotatable relative to the predetermined region about the fourth rotational axis.

In some embodiments of the optics system, the first mirror may be disposed at a Newton focus or a Nasmyth focus of the telescope. The first rotational axis may be orthogonal to the optical axis, the second rotational axis may be orthogonal to the first rotational axis and the third rotational axis, and the third rotational axis may be orthogonal to the fourth rotational axis.

In some embodiments, the optics system may further include an eighth mirror disposed in the optical path between the second mirror and the third mirror to direct the second reflected beam from the second mirror to the third mirror. In some embodiments, the optics system may further include a ninth mirror disposed in the optical path between the fourth mirror and the fifth mirror to direct the fourth reflected beam from the fourth mirror to the fifth mirror. In some embodiments, the optics system may further include a tenth mirror disposed in the optical path between the sixth mirror and the seventh mirror to direct the sixth reflected beam from the sixth mirror to the seventh mirror.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Figure 1:
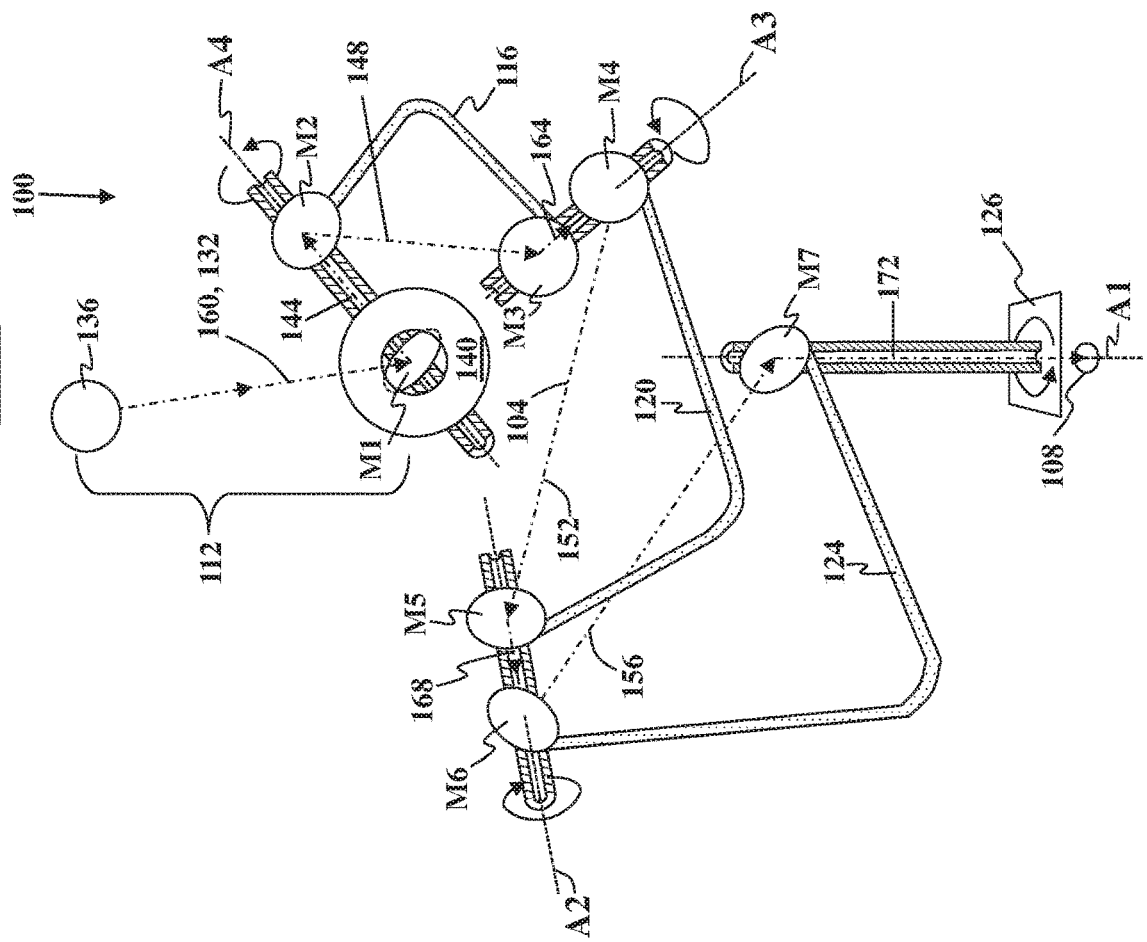
FIG. 1 is a schematic illustration of an optics system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" may be construed as X only, Y only, Z only, or any combination of two or more items X, Y, and Z (e.g., XYZ, XYY, YZ, ZZ).

In the drawings, the size and relative sizes of layers and regions may be exaggerated for clarity. Referring now to the drawings, and more particularly to FIGS. 1 through 8, where similar reference characters denote corresponding features consistently throughout the figures, there are shown exemplary embodiments.

Embodiments herein provide an optics system. The optics system may include an optical path capable of rotating about four different axes and the optical path may focus light to a focal plane at a predetermined region in space, regardless of the orientation of the incident beam. The optics system may utilize a Coudé path along each axis of a four-axis based optical system. For example, the optics system according to embodiments herein may be used for astronomical viewing. A Coudé focus may be useful for a telescope and for the instruments used to analyze the light collected by the telescope. On the other hand, not having a Coudé focus for an optical system, e.g., a telescope, may limit which instruments may be used for analysis, as instrument size may be limited based on the confines of the design. However, an external Coudé focus capable of rotating about four axes enables not only the input light beam to come from any angle, but also provides the use of physically larger and heavier scientific analysis equipment, opening up new studies of the light beam collected by the telescope or optical system at hand.

Figure 2:
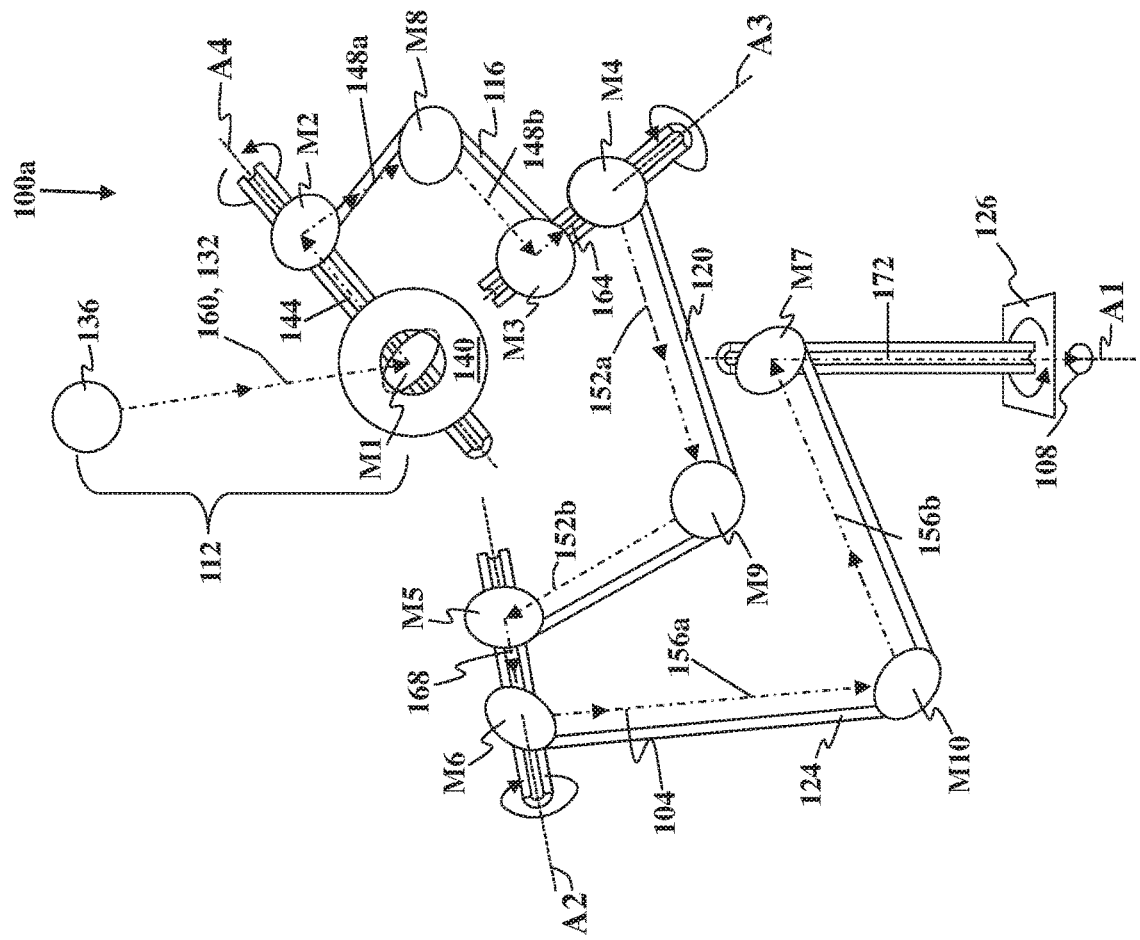
FIG. 2 is a schematic illustration of an optics system according to an embodiment herein.
Figure 3:
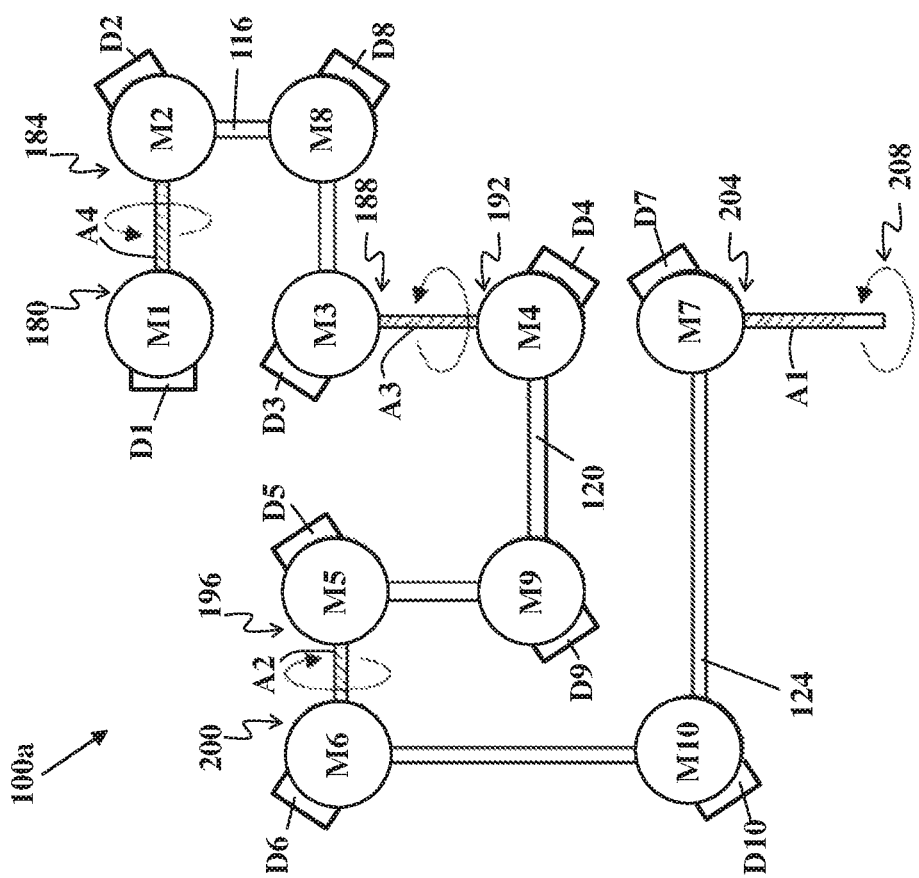
FIG. 3 is a schematic illustration of the optics system of FIG. 2 in another orientation according to an embodiment herein.
Figure 4:
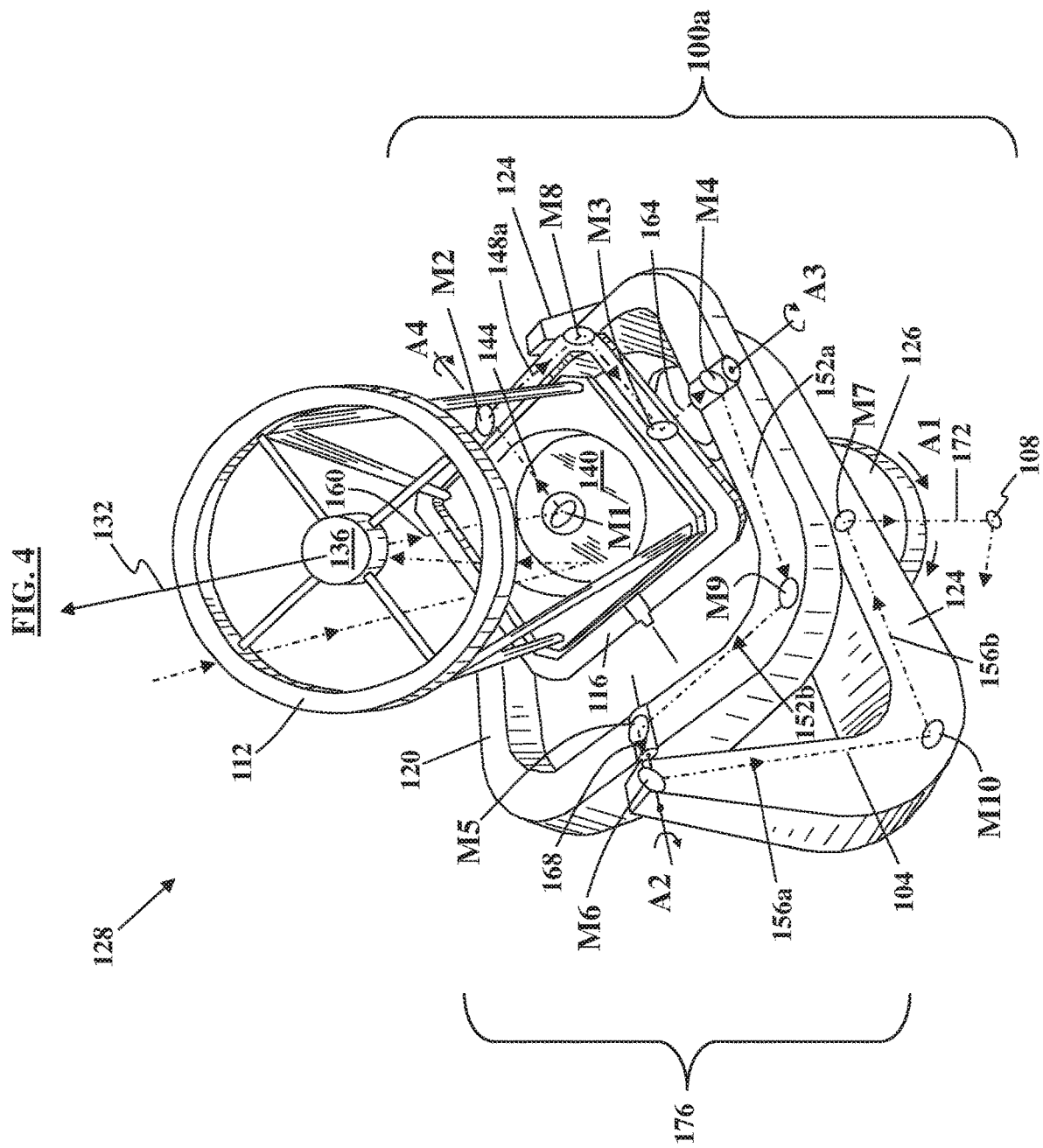
FIG. 4 is a schematic illustration of the optics system of FIG. 2 disposed on a quad axis telescope mount and a telescope disposed on the quad axis telescope mount according to an embodiment herein.

In FIGS. 1 through 4 the optics system 100 may include at least seven mirrors as shown in FIG. 1, and in one embodiment, may include at least ten mirrors as shown in FIGS. 2 through 4. Mirrors M1 through M7 may be arranged around and centered about four orthogonal, rotational axes A1 through A4 in a quad-axis Coudé optical path 104 according to an embodiment herein. The four orthogonal, rotational axes may include a first axis A1, a second axis A2, a third axis A3, and a fourth axis A4. The rotational axes A1, A2, A3, A4 may be consecutively dependent on one another. That is, the first axis A1 may move all of the second axis A2, third axis A3, and fourth axis A4 with respect to the first axis A1. The second axis A2 may move the third axis A3 and the fourth axis A4 with respect to the second axis A2, and the third axis A3 may move the fourth axis A4 with respect to the third axis A3.

The plurality of mirrors M1 through M7 may direct light to a predetermined region 108 irrespective of an orientation of an incident beam 160 directed to the plurality of mirrors M1 through M7.

As illustrated in FIGS. 1-4, the first axis A1 may be positioned orthogonal to the horizon, and the second axis A2 may be parallel to the horizon and orthogonal to the first axis A1. The third axis A3 may be orthogonal to each of the second axis A2 and the fourth axis A4. While the third axis A3 may always be orthogonal to the second axis A2 and the fourth axis A4, the third axis A3 may be parallel to the first axis A1, depending on the rotation of the second axis A2, for example, at the 0 degree and 180 degree positions when the positioning shown in FIG. 3 corresponds to a 0 degree rotation. The fourth axis A4 may always be orthogonal to the third axis A3, but may be parallel to the second axis A2, for example, when the third axis A3 is at the 0 degree and 180 degree positions (see FIG. 3). Further, while the fourth axis A4 may always be orthogonal to the third axis A3, the fourth axis A4 may be parallel to the first axis A1, for example, when the second axis A2 is at the 90 degree or 270 degree positions with the third axis A3 at its own 90 degree or 270 degree positions (see FIG. 3).

The mirrors, e.g. M1 through M10, may be any of flat mirrors and curved mirrors. For example, in some embodiments, mirrors M1 through M10 may be curved and used to further focus the beam, such as incident light beam 160, along the optical path 104. In other embodiments, mirrors M1 through M10 may be flat such that they direct the beam along the optical path 104. In these instances, the first mirror M1 may be positioned at the Newton focus or Nasmyth focus of the telescope 112.

Referring to FIG. 1, the mirrors may include seven mirrors M1 through M7, as illustrated. Additional mirrors may be used in the light beam after seventh mirror M7 to further redirect light along another path. Additional mirrors may also be used on the inner gimbal 116, the outer gimbal 120, and the main yoke 124, as long as the light beam 160 travels on the optical path 104 and along the axes of rotation A1 through A4, for example, between the telescope 112 and the inner gimbal 116, between the inner gimbal 116 and the outer gimbal 120, between the outer gimbal 120 and the main yoke 124, or between the main yoke 124 and the floor 126. In this manner, the plurality of mirrors may include at least seven mirrors M1, M2, M3, M4, M5, M6, M7. The seven mirrors M1, M2, M3, M4, M5, M6, M7 may define the optical path 104 along the axes of rotation A1 through A4 without directing the optical path 104 around each structure.

As illustrated in FIG. 1, the optical path 104 may be directed from the mirror M2 at the fourth axis A4 to mirrors M3-M4 at the third axis A3, from the mirror M4 at the third axis A3 to mirrors M5-M6 at the second axis A2, and from the mirror M6 at the second axis A2 to the mirror M7 and predetermined region 108 at the first axis A1.

In the embodiment of FIG. 1, the seven mirrors M1 through M7 may be arranged in a specific geometric pattern around and centered about the four rotational axes A1 through A4. The axes A1 to A4 may be consecutively dependent on one another, and the first axis A1 may move all others with respect to only itself, the third and fourth axes A3 and A4 may move about the second axis A2, and the fourth axis A4 may move about the third axis A3. In this way, the main yoke 124 and the outer gimbal 120, rotatable about the first axis A1 and the second axis A2, respectively, may each have two mirrors (i.e., mirrors M6-M7 with main yoke 124 and mirrors M4-M5 with outer gimbal 120), one to reflect the light beam along optical path 104 on to the next axis (i.e., M4, M6) and one to orient the light into position at the next axis (i.e., M5, M7). The inner gimbal 116 may have two mirrors (mirrors M2, M3 or similar arrangement in the illustrated embodiment) as described above for the main yoke 124 and the outer gimbal 120, and another mirror (i.e., mirror M1) may be disposed on the telescope 112 such that mirror M1 is rotatable to allow for a fourth axis of movement A4. The first mirror M1 may direct the light beam (i.e., incident beam 160) along the optical path 104 along the fourth axis of movement A4 to the first mirror of the inner gimbal, such as mirror M2.

The optics system 100 may include rotational mechanisms D1 through D7 (illustrated in FIG. 3) that may be used for adjusting the mirrors M1 through M7, rotating the axes A1 through A4, or rotating the mirrors M1 though M7 when the mirrors are disposed off-center of its corresponding axis of rotation A1 through A4. The rotational mechanisms D1 through D7 may make adjustments to the alignment of the corresponding mirrors M1 through M7, respectively, such as fine adjustments. The rotational mechanisms D1 through D7 may rotate the axes A1 through A4, to selectively rotate the main yoke 124, outer gimbal 120, inner gimbal 116, and telescope 112, respectively. Also, the rotational mechanisms D1 through D7 may be used to selectively rotate the corresponding mirrors M1 through M7, respectively, when the mirrors M1 through M7 are disposed off-center from the respective corresponding axis of rotation A1 through A4.

The plurality of mirrors may include ten mirrors M1 through M10 as illustrated in the optics system 100a of FIGS. 2-4. In addition to the seven mirrors M1 through M7 described above for optics system 100 (see FIG. 1), an eighth mirror M8 may be disposed in the optical path 104 on the inner gimbal 116, a ninth mirror M9 may be disposed in the optical path 104 on the outer gimbal 120, and a tenth mirror M10 may be disposed in the optical path 104 on the main yoke 124. Additional mirrors may also be used on the inner gimbal 116, the outer gimbal 120, and the main yoke 124, as long as the light beam travels down each of the axes of rotation A1 through A4, as described above.

In the embodiment corresponding to optics system 100a (FIGS. 2-4), the ten mirrors M1 through M10 may be arranged in a specific geometric pattern around and centered on the four rotational axes A1 through A4. For example, the main yoke 124 and the outer gimbal 120, which are rotatable about the first axis A1 and the second axis A2, respectively, may each have three mirrors located in an "L" shape: two to reflect the light beam 160 along optical path 104 on to the next axis, and one to orient the light beam 160 into position at the corner, e.g. M2, M8, M3; M4, M9, M5; and M6, M10, M7 each comprise the "L" shape. The inner gimbal 116 may have three mirrors (e.g., M2, M3, M8) creating a block "L"

shape: two to reflect the light beam along optical path 104 on to the next axis, and one to orient the light into position at the corner (the corner comprising M8, M9, M10) as described above. The "L" shape may be useful to direct the optical path 104 around structural members, such as shown in the illustrated embodiment illustrated of FIG. 4.

In some embodiments, the optical path 104 may be hidden within the inner and outer gimbals 116 and 120 and main yoke 124 structures (see FIG. 4). As illustrated in FIGS. 1-4, seven of the ten mirrors M1, M2, M3, M4, M5, M6, and M7 may be centered on the different axes A1, A2, A3, A4. An external means of rotation D1, D2, D3, D4, D5, D6, and D7 may be provided instead of rotating the axes about their centers. Any additional mirrors, such as mirrors M8, M9, and M10, may be disposed in corresponding adjustable mounts with external means of rotation D8, D9, and D10. An external means of rotation D1 through D10 may be a stepper motor, mechanical drive, pulleys, rods, pistons, and the like, or combinations thereof, including connections by gears, and the like.

Due to the symmetry of the optics system in some embodiments, the inner and outer gimbals 116 and 120 and yoke 124 may be mirrored. For example, the mirrors that make up the optical path may be disposed in "L" shapes mirrored to the illustrated "L" shapes to provide the same final result.

As depicted in FIGS. 2-4, the inner gimbal 116 supports mirrors M2, M3, and M8 and makes an "L" shape. The inner gimbal 116 is rotatable about the third axis A3, which may be perpendicular to the fourth axis A4; the orientation of the fourth axis A4 is dependent on the third axis A3, and the fourth axis A4 may be rotated independently. Incident beam 160 may be directed onto the mirror M1 in a fashion indicated by FIGS. 1, 2, and 4. The mirror M1 may be the only mirror capable of being rotated about the fourth axis A4. Light from the mirror M1 may be reflected along optical path 104 onto the second mirror M2 at the inner gimbal 116. Second mirror M2 may also be centered upon the fourth axis A4, but may be independent of the fourth axis A4 rotation. The mirror M2 may direct the optical path to the mirror M8 at the corner of the inner gimbal 116, which may direct the beam 160 along the optical path 104 to the mirror M3, which may be centered along the third axis A3. In one embodiment (see FIG. 1), the mirror M8 may be removed and the mirrors M2 and M3 adjusted so that the optical path 104 extends directly from the fourth axis A4 to the third axis A3, provided that the light beam is not interrupted by any external supports or components of the telescope 112 or quad axis mount 176.

The outer gimbal 120 may comprise mirrors M4, M5, and M9, in addition to being the mount for the inner gimbal, and may further comprise an "L" shape. The outer gimbal 120 is rotatable about the second axis A2, which may be perpendicular to the third axis A3, but not necessarily perpendicular to the fourth axis A4, which may lie parallel depending on the orientation of the third axis A3. Light beam 160 from the inner gimbal 116 mirror M3 may be directed along the third axis A3 to mirror M4 on the outer gimbal 120. Mirror M4 may be independent of the third axis A3 rotation, and mirror M4 may direct the optical path 104 and beam 160 to the corner mirror M9, and then to mirror M5, which may be centered along the second axis A2. Note that, in some embodiments, mirror M9 may be removed and mirrors M4 and M5 may be adjusted so that the optical path 104 extends directly from the third axis A3 to the second axis A2, as illustrated in FIG. 1, provided that the light beam 160 is not interrupted by any external supports or components of the telescope 112 or quad axis mount 176.

The main yoke 124, may comprise mirrors M6, M7, and M10, in addition to being the mount for both the inner gimbal 116 and outer gimbal 120, and may also define an "L" configuration of mirrors M6, M7, and M10. The main yoke 124 is rotatable about the first axis A1, which is perpendicular to the second axis A2, but axis A1 is not necessarily perpendicular to the third axis A3 or the fourth axis A4. Mirror M6 may be centered along the second axis A2, but may be independent of the rotation of axis A2, and may reflect light beam 160 along optical path 104 to the corner mirror M10 and then to mirror M7, which may be centered on the first axis A1. The corner mirror M10 may be removed, for example, as described for mirrors M8 and M9, and mirrors M6 and M7 may be adjusted so that light optical path 104 extends directly from the second axis A2 to the first axis A1, provided that the light beam is not interrupted by any external supports or components of the telescope 112 or quad axis mount 176.

According to another embodiment herein, a telescope system 128 may comprise the optics system 100, 100a and the telescope 112 having an optical axis 132 (FIGS. 1-4). The telescope 112 secondary mirror 136 or lens (not shown) may reflect the incident beam 160 towards the telescope 112 primary mirror 140 (see FIG. 4) along the optical axis 132 to a Newton focus or Nasmyth focus of the telescope 112.

As illustrated in FIG. 1, the optical path 104 of the optics system 100 receives the incident beam 160 and include a first portion 144, a second portion 148, a third portion 152, and a fourth portion 156, to direct the incident beam 160 to the predetermined region 108 irrespective of the orientation of the telescope 112 optical axis 132 and irrespective of movement of the telescope 112 optical axis 132. The first portion 144 may include mirror M1 disposed on the fourth axis A4, the second portion 148 may include the mirrors M2 and M3 disposed on the inner gimbal 116, the third portion 152 may include the mirrors M4 and M5 disposed on the outer gimbal 120, and the fourth portion 156 may include the mirrors M6 and M7 disposed on the main yoke 124.

The first portion 144 of the optical path 104 may have the mirror M1 disposed on the fourth axis A4, and the mirror M1 may be configured to receive the incident beam 160 along the optical axis 132 of the telescope 112 and direct the received incident beam 160 along the fourth axis A4 toward mirror M2. The second portion 148 of the optical path 104 may be rotatable with respect to the first portion 144. The second portion 148 may be configured to direct the incident beam 160 from the fourth axis A4 to the third axis A3. The third portion 152 of the optical path 104 may be rotatable with respect to the second portion 148. The third portion 152 may be configured to direct the beam 160 from the third axis A3 to the second axis A2. The fourth portion 156 of the optical path 104 may be rotatable with respect to the third portion 152, and the fourth portion 156 may be configured to direct the beam 160 from the second axis A2 to the first axis A1, and then to the predetermined region 108 via mirror M7.

Referring to FIG. 2, with reference to FIG. 1, the incident beam 160 is directed along an optical path 104 having a configuration different from that illustrated in FIG. 1. For example, the second portion 148 (see FIG. 1) of the optical path 104 may be replaced by a first sub portion 148a and a second sub portion 148b when the second portion 148 further includes the eighth mirror M8 (see FIG. 2). Additional mirrors (not shown) in the second portion 148 may define additional sub portions. The third portion 152 of the optical path 104 may be replaced by a first sub portion 152a and a second sub portion 152b when the third portion 152 includes the ninth mirror M9. The fourth portion 156 of the optical path 104 may be replaced by a first sub portion 156a and a second sub portion 156b when the fourth portion 156 includes the tenth mirror M10.

In the telescope system 128 (see FIG. 4), the optical axis 132 of the telescope 112 may be articulable about the first, second, third, and fourth axes A1, A2, A3, and A4. For example, the telescope 112 may articulate selectively about any of the first, second, third, and fourth axes A1, A2, A3, and A4 to track an orbiting satellite's motion across the sky. The optical path 104 is configured to reflect the incident beam 160 to the predetermined region 108 irrespective of any rotation of any of the first, second, third, and fourth rotational axes A1, A2, A3, and A4.

In another embodiment disclosed herein, the optics system 100 (see FIG. 1) having an optical path 104 for a quad-axis telescope mount 176 is described. The optical path 104 may include the first mirror M1, the second mirror M2, the third mirror M3, the fourth mirror M4, the fifth mirror M5, the sixth mirror M6, and the seventh mirror M7. The first mirror M1 may be disposed on the fourth rotational axis A4, and the first mirror M1 may be aligned to reflect the incident beam 160 along the first portion 144 of the optical path 104, coincident with the fourth axis A4 toward the second mirror M2. The second mirror M2 is spaced apart from the first mirror M1 along the fourth rotational axis A4, but stationary relative to a rotation of the fourth axis A4. The second mirror M2 may be aligned to reflect the incident beam 160 from the fourth axis A4 along the second portion 148 of the optical path 104, toward the third mirror M3 on the third rotational axis A3.

The first mirror M1 may be disposed on the fourth axis A4. The second mirror M2 may also be disposed on the fourth axis A4 and rotatable relative to the first mirror M1. The third mirror M3 may be disposed on the third rotation axis A3, and may be aligned to direct the incident beam 160 along the third axis A3 toward the fourth mirror M4. The fourth mirror M4 may be disposed on the third axis A3. The fourth mirror M4 is spaced apart from the third mirror M3 along the third axis A3, but stationary relative to rotation of the third axis A3. The fourth mirror M4 may be configured to reflect the incident beam 160 from the third axis A3 toward mirror M5 on axis A2.

The fifth mirror M5 may be disposed on the second axis A2, and may be aligned to direct the incident beam 160 toward sixth mirror M6. The sixth mirror M6 is spaced apart from the fifth mirror M5 and is disposed along the second axis A2, but mirror M6 may be stationary relative to a rotation of the second axis A2. The sixth mirror M6 may be aligned to direct the incident beam 160 from the second axis A2. The seventh mirror M7 may be disposed on the first axis A1 and aligned to direct the incident beam 160 from the sixth mirror M6 along the first axis A1 to the predetermined region 108. The predetermined region 108 may be spaced apart from the seventh mirror M7 and disposed along the first axis A1, but stationary relative to a rotation of the first axis A1. In the optics system 100 (see FIG. 1), the optical path 104 may be configured to direct the incident beam 160 to the predetermined region 108 irrespective of any rotation of the first, second, third, and fourth rotational axes A1, A2, A3, and A4.

In the optics system 100 (see FIG. 1), the second and third mirrors M2 and M3 may be disposed on a first yoke (the inner gimbal) 116 and rotatable about the fourth rotational axis A4 relative to the first mirror M1. The fourth and fifth mirrors M4 and M5 may be disposed on a second yoke (the outer gimbal) 120 and rotatable about the third rotational axis A3 relative to the first yoke 116. The sixth and seventh mirrors M6 and M7 may be disposed on a third yoke (main yoke) 124 and rotatable about the second rotational axis A2 relative to the second yoke 120, and rotatable about the first rotational axis A1 relative to the predetermined region 108.

In the optics system 100, the first mirror M1 may be disposed at a Newton focus or a Nasmyth focus of the telescope 112. The fourth rotational axis A4 may be orthogonal to the optical axis 132 of the telescope 112. The third rotational axis A3 may be orthogonal to the fourth rotational axis A4 and the second rotational axis A2. Additionally, the second rotational axis A2 may be orthogonal to the first rotational axis A1.

According to another embodiment (see FIG. 2), the optical path 104 may further include an eighth mirror M8 disposed in the optical path 104 between the second mirror M2 and the third mirror M3 to direct the incident beam 160 along a first sub portion 148a and a second sub portion 148b, from the second mirror M2 to the third mirror M3. The optical path 104 may further include a ninth mirror M9 disposed in the optical path 104 between the fourth mirror M4 and the fifth mirror M5 to direct the incident beam 160 along a first sub portion 152a and a second sub portion 152b, from the fourth mirror M4 to the fifth mirror M5. Additionally, a tenth mirror M10 may be disposed in the optical path 104 between the sixth mirror M6 and the seventh mirror M7 to direct the incident beam 160 along a first sub portion 156a and a second sub portion 156b, from the sixth mirror M6 to the seventh mirror M7.

In further embodiments, a telescope system 528 and an optics system 500 according to exemplary embodiments of the disclosure are herein presented in a top-down illustrated description from the perspective of an incident beam 560 incident on the telescope system 528 and the optics system, with reference to FIGS. 5 through 8. In the following description, a first rotational axis R1 corresponds to the fourth rotational axis A4 in the above description. Likewise, a second rotational axis R2 in the following description corresponds to the third rotational axis A3 above, a third rotational axis R3 below corresponds to the second rotation axis A2 above, and a fourth rotational axis R4 below corresponds to the first rotational axis A1 above.

The telescope system 528 may include the optics system 500, 500a and a telescope 512 having an optical axis 532. The telescope 512 may include a secondary mirror 536 or a lens (not shown) to direct the incident beam 560 towards the telescope 512 primary mirror 540 along the telescope 512 optical axis 532 to a Newton focus or Nasmyth focus of the telescope 512. The optics system 500, 500a includes an optical path 504 that may receive the incident beam 560. The optical path 504 may include a first portion 544, a second portion 548, a third portion 552, and a fourth portion 556, to reflect the incident beam 560 to a predetermined region 508 irrespective of the orientation of the telescope 512 optical axis 532 and irrespective of movement of the telescope 512 optical axis 532.

Figure 5:
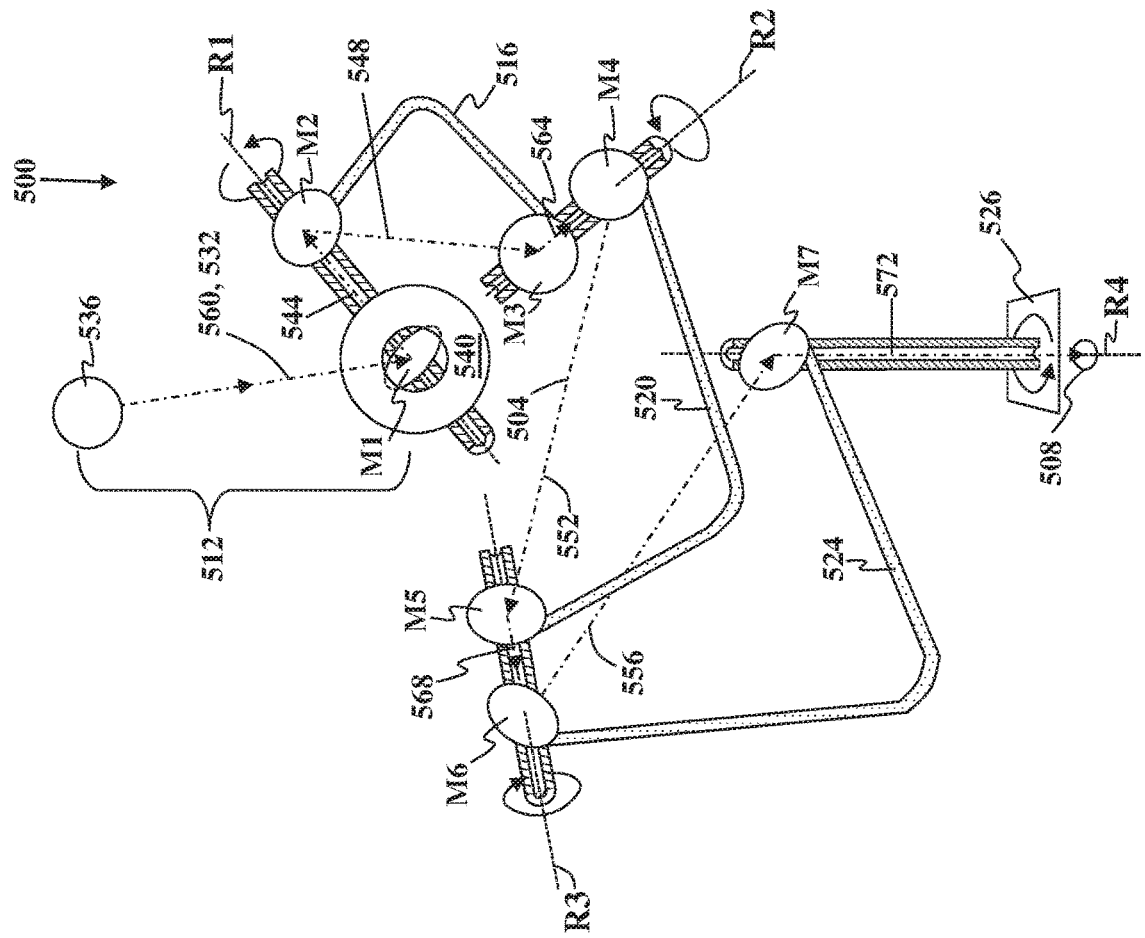
FIG. 5 is a schematic illustration of an optics system according to an embodiment herein.

In the embodiment of FIG. 5, the first portion 544 may be defined by a first mirror M1 and second mirror M2 disposed on a first rotational axis R1, the second portion 548 may be defined by the second mirror M2 and a third mirror M3 disposed on a first yoke 516, the third portion 552 may be defined by a fourth mirror M4 and a fifth mirror M5 disposed on a second yoke 520, and the fourth portion 556 may be defined by a sixth mirror M6 and a seventh mirror M7 disposed on a third yoke 524. The incident light beam 560 is directed from mirror M3 to mirror M4 along second axis R2, and from mirror M5 to mirror M6 along axis R3. The incident beam 560 is directed to the predetermined region 508 by mirror M7, as illustrated in FIG. 5.

The first portion 544 of the optical path 504 may comprise the first mirror M1 and second mirror M2 disposed on the first axis R1, and the first mirror M1 may be configured to receive incident beam 560 from the optical axis 532 of the telescope 512 and direct the received incident beam 560 along the first axis R1 toward mirror M2. The second portion 548 of the optical path 504 (between mirrors M2, M3) may be rotatable with respect to the first portion 544 along the first axis R1. The second portion 548 may be configured to direct the beam from mirror M2 on the first axis R1 to mirror M3 on the second axis R2. The third portion 552 of the optical path 504 may be rotatable with respect to the second portion 548. The third portion 552 may be configured to reflect the incident beam 560 from mirror M4 on the second axis R2 to mirror M5 on the third axis R3. The fourth portion 556 of the optical path 504 may be rotatable to the third portion 552 along the third axis R3. The fourth portion 556 may be configured to direct the beam from mirror M6 on the third axis R3 to mirror M7 on the fourth axis R4, and then to a predetermined region 508.

Figure 6:
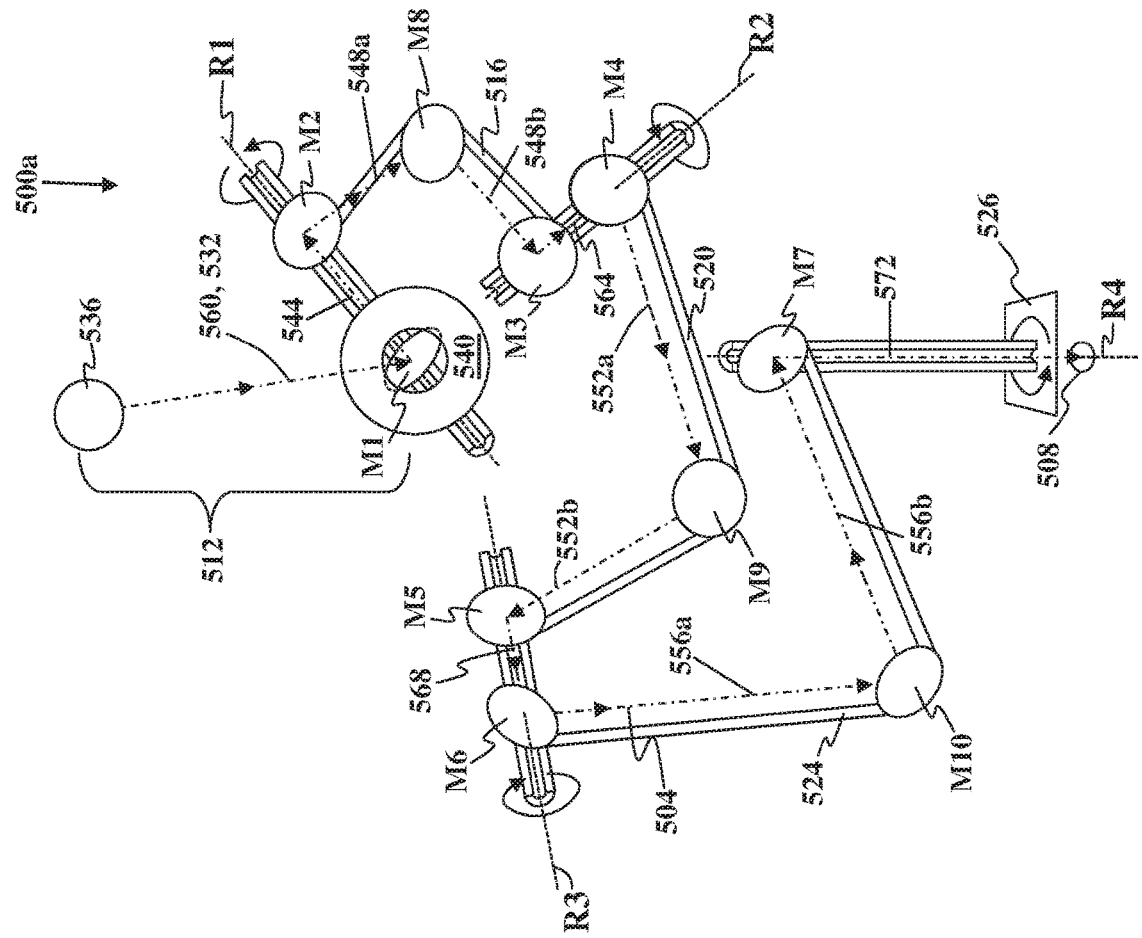
FIG. 6 is a schematic illustration of an optics system according to an embodiment herein.
Figure 7:
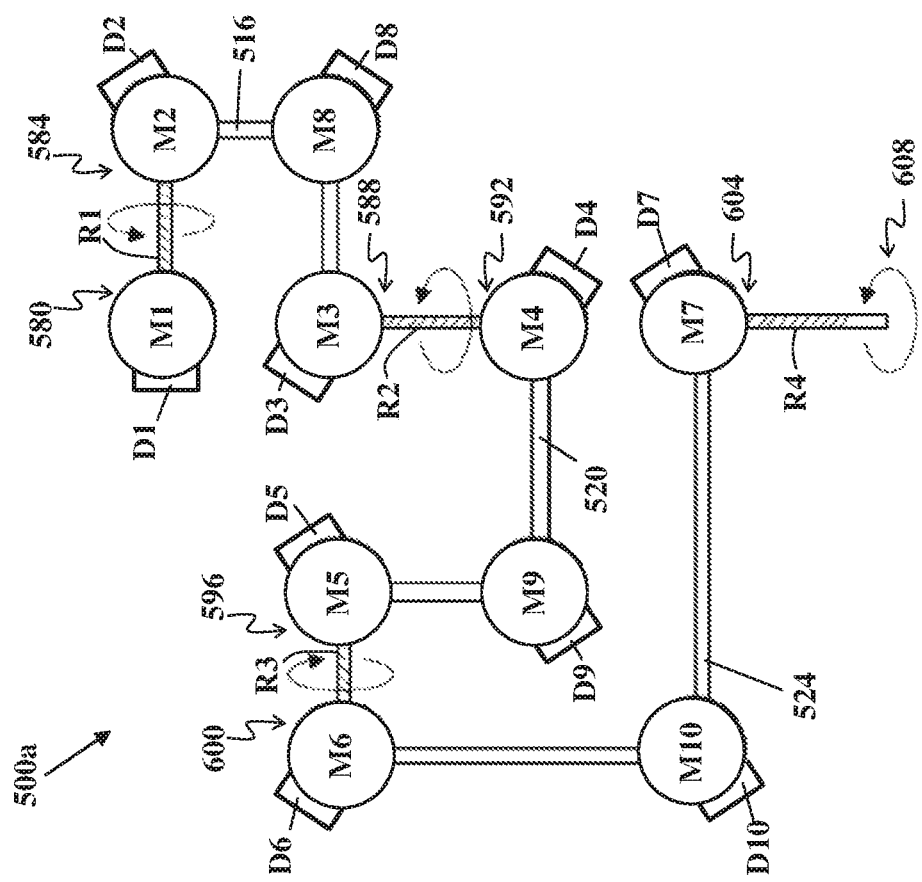
FIG. 7 is a schematic illustration of the optics system of FIG. 6 in another orientation according to an embodiment herein.
Figure 8:
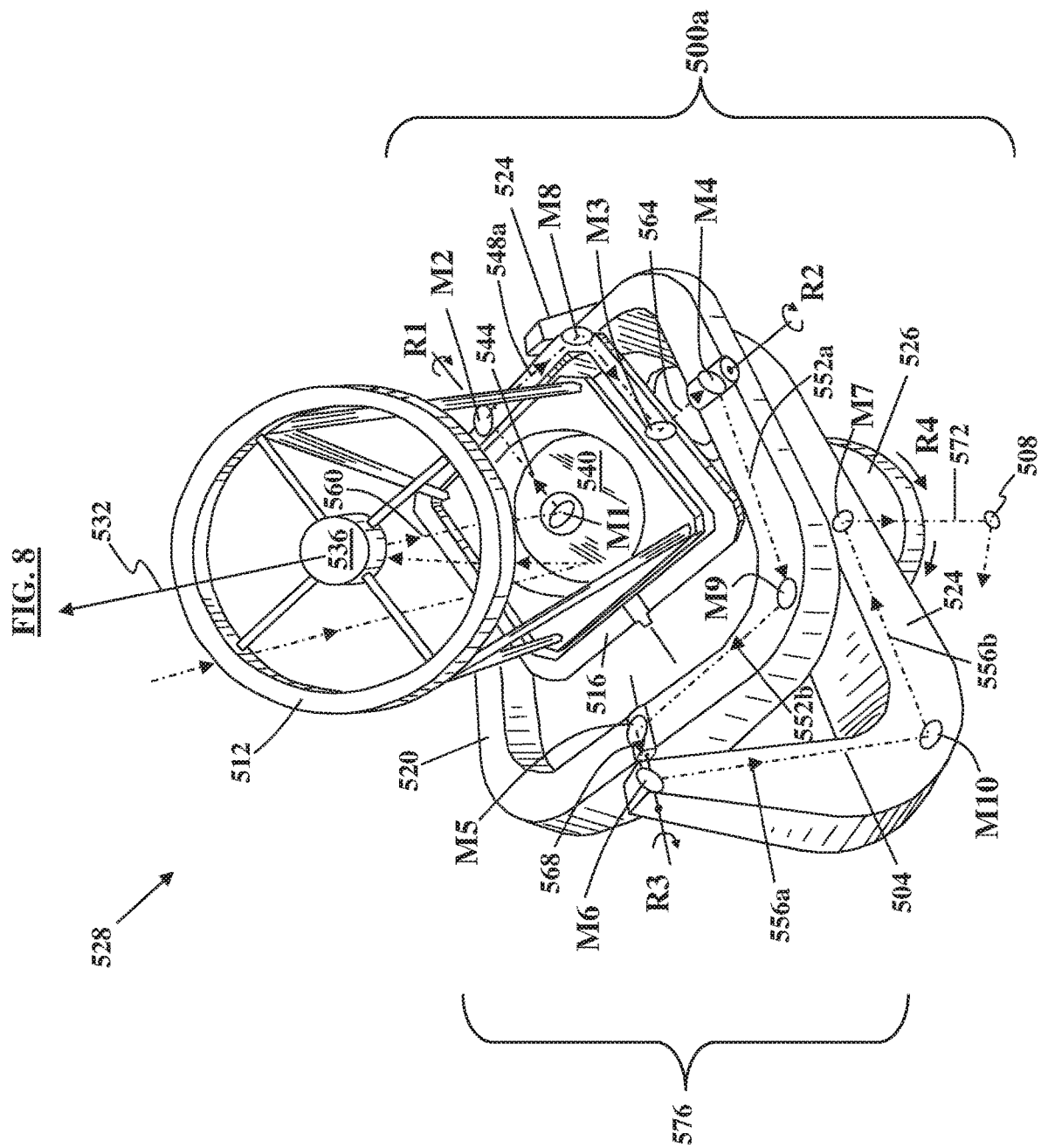
FIG. 8 is a schematic illustration of the optics system of FIG. 6 disposed on a quad axis telescope mount and a telescope disposed on the quad axis telescope mount according to an embodiment herein.

Referring to FIG. 6, with reference to FIG. 5, each of the first, second, third, and fourth portions 544, 548, 552, and 556 described with respect to FIG. 5 may be replaced or divided into sub portions, as illustrated in FIGS. 6 and 8. For example, the optical path 504 may include a first sub portion 548a and a second sub portion 548b when the optical path 504 includes the eighth mirror M8. Additional mirrors (not shown) may be included to provide additional sub portions. The optical path 504 may include a first sub portion 552a and a second sub portion 552b between mirrors M4-M5 when the optical path 504 includes the ninth mirror M9, and the optical path 504 may include a first sub portion 556a and a second sub portion 556b between mirrors M6-M7 when the optical path 504 includes the tenth mirror M10.

In the telescope system 528, the optical axis 532 of the telescope 512 may be selectively articulable about the first, second, third, and fourth axes R1, R2, R3, and R4. For example, the telescope 512 may selectively articulate about any of the first, second, third, and fourth axes R1, R2, R3, and R4 to track an orbiting satellite's motion across the sky. The optical path 504 is configured to reflect the incident beam 560 to the predetermined region 508, via the plurality of mirrors, irrespective of any rotation of any of the first, second, third, and fourth rotational axes R1, R2, R3, and R4.

In another embodiment disclosed herein, the optics system 500, 500a having an optical path 504 for a quad-axis telescope mount 576 is described. The optical path 504 may include the first mirror M1, the second mirror M2, the third mirror M3, the fourth mirror M4, the fifth mirror M5, the sixth mirror M6, and the seventh mirror M7. The first mirror M1 may be disposed on the first rotational axis R1, and aligned to reflect the incident beam 560 from the telescope 512 along the first axis R1 to mirror M2. The second mirror M2 is spaced apart from the first mirror M1 and may be disposed along the first rotational axis R1, but mirror M2 may be stationary relative to a rotation of the first axis R1. The second mirror M2 may be aligned to reflect the incident beam 560 from the first axis R1 along the second portion 548 of the optical path 504 to mirror M2 on axis R2. The third mirror M3 may be disposed on the second rotational axis R2, and may be aligned to reflect the incident beam 560 along the second axis R2 to mirror M4. The fourth mirror M4 is spaced apart from the third mirror M3 and may be disposed along the second axis R2, but mirror M4 may be stationary relative to a rotation of the second axis R2. The fourth mirror M4 may be configured to reflect the incident beam 560 from mirror M4 on the second axis R2 to mirror M5 on axis R3 along the third portion 552 of the optical path 504.

The fifth mirror M5 may be disposed on the third axis R3 with mirror M6, and may be aligned to reflect the incident beam 560 from the third portion 552 of the optical path 504 along the third axis R3. The sixth mirror M6 is be spaced apart from the fifth mirror M5 and may be disposed along the third axis R3, but may be stationary relative to a rotation of the third axis R3. The sixth mirror M6 may be aligned to reflect the incident beam 560 from the third axis R3 along the fourth portion 556 of the optical path 504 to mirror M7. The seventh mirror M7 may be disposed on the fourth axis R4, and may be aligned to reflect the incident beam 560 along the fourth axis R4 to the predetermined region 508. The predetermined region 508 may be spaced apart from the seventh mirror M7 and may be disposed along the fourth axis R4, but stationary relative to a rotation of the fourth axis R4. In the optics system 500, 500a, the optical path 504 may be configured to reflect the incident beam 560 to the predetermined region 508 via the plurality of mirrors irrespective of any rotation of the first, second, third, and fourth rotational axes R1, R2, R3, and R4.

In the optics system 500, 500a the second and third mirrors M2 and M3 may be disposed on a first yoke 516 rotatable about the first rotational axis R1 relative to the first mirror M1. The fourth and fifth mirrors M4 and M5 may be disposed on a second yoke 520 rotatable about the second rotational axis R2 relative to the first yoke 516. The sixth and seventh mirrors M6 and M7 may be disposed on a third yoke 524 rotatable about the third rotational axis R3 relative to the second yoke 520, and also rotatable about the fourth rotational axis R4 relative to the predetermined region 508.

In the optics system 500, 500a the first mirror M1 may be disposed at a Newton focus or a Nasmyth focus of the telescope 512. The first rotational axis R1 may be orthogonal to the optical axis 532 of the telescope 512. The second rotational axis R2 may be orthogonal to the first rotational axis R1 and the third rotational axis R3. Additionally, the third rotational axis R3 may be orthogonal to the fourth rotational axis R4.

In the optics system 500, 500a (see FIGS. 6-8), the optical path 504 may further include an eighth mirror M8 disposed in the optical path 504 between the second mirror M2 and the third mirror M3 to direct the incident beam 560 along a first sub portion 548a and a second sub portion 548b from the second mirror M2 to the third mirror M3. The optical path 504 may further include a ninth mirror M9 disposed in the optical path 504 between the fourth mirror M4 and the fifth mirror M5 to direct the incident beam 560 along a first sub portion 552a and a second sub portion 552b from the fourth mirror M4 to the fifth mirror M5. The optics system 500, 500a may further include a tenth mirror M10 disposed in the optical path 504 between the sixth mirror M6 and the seventh mirror M7 to direct the incident beam 560 along a first sub portion 556a and a second sub portion 556b from the sixth mirror M6 to the seventh mirror M7.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An optics system for a telescope, the system comprising:
   an optical path comprising:
   a first mirror disposed on a first portion of a first rotational axis, and configured to reflect an incident beam from along an optical axis of said telescope to along said first rotational axis as a first reflected beam;
   a second mirror spaced apart from said first mirror and disposed on a second portion of said first rotational axis, and configured to reflect said first reflected beam from said first rotational axis as a second reflected beam, wherein said second portion of said first rotational axis is rotatable relative to said first portion of said first rotational axis;
   a third mirror disposed on a first portion of a second rotational axis, and configured to reflect said second reflected beam as a third reflected beam along said second rotational axis;
   a fourth mirror disposed on a second portion of said second rotational axis, and configured to reflect said third reflected beam from said second rotational axis as a fourth reflected beam, wherein said second portion of said second rotational axis is rotatable relative to said first portion of said second rotational axis;
   a fifth mirror disposed on a first portion of a third rotational axis, and configured to reflect said fourth reflected beam as a fifth reflected beam along said third rotational axis;
   a sixth mirror disposed on a second portion of said third rotational axis, and configured to reflect said fifth reflected beam from said third rotational axis as a sixth reflected beam, wherein said second portion of said third rotational axis is rotatable relative to said first portion of said third rotational axis; and
   a seventh mirror disposed on a first portion of a fourth rotational axis, and configured to reflect said sixth reflected beam as a seventh reflected beam along said fourth rotational axis to a predetermined region disposed on a second portion of said fourth rotational axis, wherein said second portion of said fourth rotational axis is rotatable relative to said first portion of said fourth rotational axis,
   wherein said optical axis of said telescope is articulable about the first, second, third, and fourth rotational axes corresponding to a main yoke, an outer gimbal, an inner gimbal, wherein said optical path is physically hidden within the main yoke, outer gimbal, and inner gimbal,
   wherein said optical path is configured to reflect said incident beam to said predetermined region as said seventh reflected beam irrespective of any rotation of said first, second, third, and fourth rotational axes.

2. The system of claim 1, wherein the second and third mirrors are disposed on a first yoke rotatable relative to said first mirror about said first rotational axis,
   wherein the fourth and fifth mirrors are disposed on a second yoke rotatable relative to said first yoke about said second rotational axis, and
   wherein the sixth and seventh mirrors are disposed on a third yoke rotatable relative to said second yoke about said third rotational axis and rotatable relative to said predetermined region about said fourth rotational axis.

3. The system of claim 1, wherein said first mirror is configured to be disposed at a Newton focus or a Nasmyth focus of said telescope.

4. The system of claim 1, wherein said first rotational axis is orthogonal to said optical axis,
   wherein said second rotational axis is orthogonal to said first rotational axis and said third rotational axis, and
   wherein said third rotational axis is orthogonal to said fourth rotational axis.

5. The system of claim 1, further comprising an eighth mirror disposed in said optical path between said second mirror and said third mirror to direct said second reflected beam from said second mirror to said third mirror.

6. The system of claim 1, further comprising a ninth mirror disposed in said optical path between said fourth mirror and said fifth mirror to direct said fourth reflected beam from said fourth mirror to said fifth mirror.

7. The system of claim 1, further comprising a tenth mirror disposed in said optical path between said sixth mirror and said seventh mirror to direct said sixth reflected beam from said sixth mirror to said seventh mirror.

* * * * *